United States Patent
Gan et al.

(10) Patent No.: US 11,263,003 B1
(45) Date of Patent: Mar. 1, 2022

(54) INTELLIGENT VERSIONING OF MACHINE LEARNING MODELS

(71) Applicant: Kyndryl, Inc., Armonk, NY (US)

(72) Inventors: Seng Chai Gan, Ashburn, VA (US);
Shikhar Kwatra, San Jose, CA (US);
Gandhi Sivakumar, Bentleigh (AU);
Vinod A. Valecha, Pune (IN); Thomas Joseph Eunice, Studio City, CA (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/122,415

(22) Filed: Dec. 15, 2020

(51) Int. Cl.
*G06F 8/71* (2018.01)
*G06N 20/00* (2019.01)
*G06F 16/28* (2019.01)
*G06F 16/21* (2019.01)

(52) U.S. Cl.
CPC .............. *G06F 8/71* (2013.01); *G06F 16/219* (2019.01); *G06F 16/285* (2019.01); *G06N 20/00* (2019.01)

(58) Field of Classification Search
CPC ........................................................ G06F 8/71
See application file for complete search history.

(56) References Cited

U.S. PATENT DOCUMENTS

| | | | |
|---|---|---|---|
| 10,380,500 B2 | 8/2019 | Miao et al. | |
| 10,387,799 B2 | 8/2019 | Mahler | |
| 10,713,594 B2 | 7/2020 | Szeto et al. | |
| 2007/0220034 A1 | 9/2007 | Iyer et al. | |
| 2019/0172224 A1* | 6/2019 | Vajda | G06T 7/77 |
| 2019/0279114 A1* | 9/2019 | Deshpande | G06N 20/00 |
| 2020/0034532 A1 | 1/2020 | Muttik et al. | |
| 2021/0232980 A1* | 7/2021 | Velagapudi | G06N 20/20 |

FOREIGN PATENT DOCUMENTS

CN 103795794 A 5/2014

OTHER PUBLICATIONS

Miao et al., ModelHub: Deep Learning Lifecycle Management, 2017 IEEE 33rd International Conference on Data Engineering (ICDE), pp. 1393-1394, 2017.

(Continued)

*Primary Examiner* — Jae U Jeon
(74) *Attorney, Agent, or Firm* — Garg Law Firm, PLLC; Rakesh Garg; Erik Swanson

(57) ABSTRACT

An embodiment includes specifying an original model to be trained by a machine learning platform using training data and an algorithm, wherein the training data includes a plurality of training input values upon which to make a prediction and a plurality of training output values representing target prediction values. The embodiment generates an updated model by training the original model to algorithmically approach the training output values as provided with the training data based on the plurality of input values. The embodiment generates an updated function map representative of output values of the updated model and versions the updated model according to a classification rule for assigning a version classification based on a comparison of the updated function map to an original function map representative of output values of the original model. The embodiment deploys the updated model into a production environment. to replace the original model.

20 Claims, 8 Drawing Sheets

(56) References Cited

OTHER PUBLICATIONS

Hohman et al., Understanding and Visualizing Data Iteratiion in Machine Learning, Proceedings of the 2020 CHI Conference on Human Factors in Computing Systems, pp. 1-13, Apr. 2020.
ip.com, System and method to detect most unbiased model version, Jan. 7, 2019, IPCOM000256871D.
ip.com, Method of maintaining feedback/training data privacy for shared machine learning models, Jan. 14, 2020, IPCOM000260978D.

* cited by examiner

INTELLIGENT VERSIONING OF MACHINE LEARNING MODELS

BACKGROUND

The present invention relates generally to machine learning. More particularly, the present invention relates to intelligent versioning of machine learning models.

Artificial intelligence (AI) is an area of computer science that refers to any human-like intelligence exhibited by a computer, robot, or other machine. In recent years, AI technology has quickly become a part of everyday life for many people. AI technology enables applications that are used to complete words as they are being typed, provide driving directions, efficiently and autonomously vacuum floors, recommend products or entertainment options, and assist with medical image analysis. The surge in AI development has been made possible by the increasing availability of large amounts of data and the corresponding development and wide availability of computer systems that can process all that data faster and more accurately than humans.

Machine learning is a branch of AI focused on technology that learns from data and performs a task with increasing accuracy over time. A method of machine learning that is frequently used is known as supervised machine learning, or just supervised learning. Supervised machine learning involves using labeled datasets to train algorithms to accurately classify data or predict outcomes. For example, a widely used supervised machine learning algorithm is linear regression, which is used to identify the relationship between a dependent variable and one or more independent variables in order to make predictions about future outcomes. Linear regression is used for a wide array of business prediction problems, such as predicting future prices or costs, predicting future revenue, or comparing performance (e.g., whether Product A is attracting more customers than Product B).

SUMMARY

The illustrative embodiments provide for intelligent versioning of machine learning models. An embodiment includes specifying an original model to be trained by a machine learning platform using training data and an algorithm, wherein the training data includes a plurality of training input values upon which to make a prediction and a plurality of training output values representing target prediction values for respective input values. The embodiment also includes generating an updated model by training the original model to algorithmically approach the training output values as provided with the training data based on the plurality of input values. The embodiment also includes generating an updated function map representative of output values of the updated model. The embodiment also includes versioning the updated model according to a classification rule for assigning a version classification based on a comparison of the updated function map to an original function map representative of output values of the original model. The embodiment also includes deploying the updated model into a production environment. to replace the original model. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
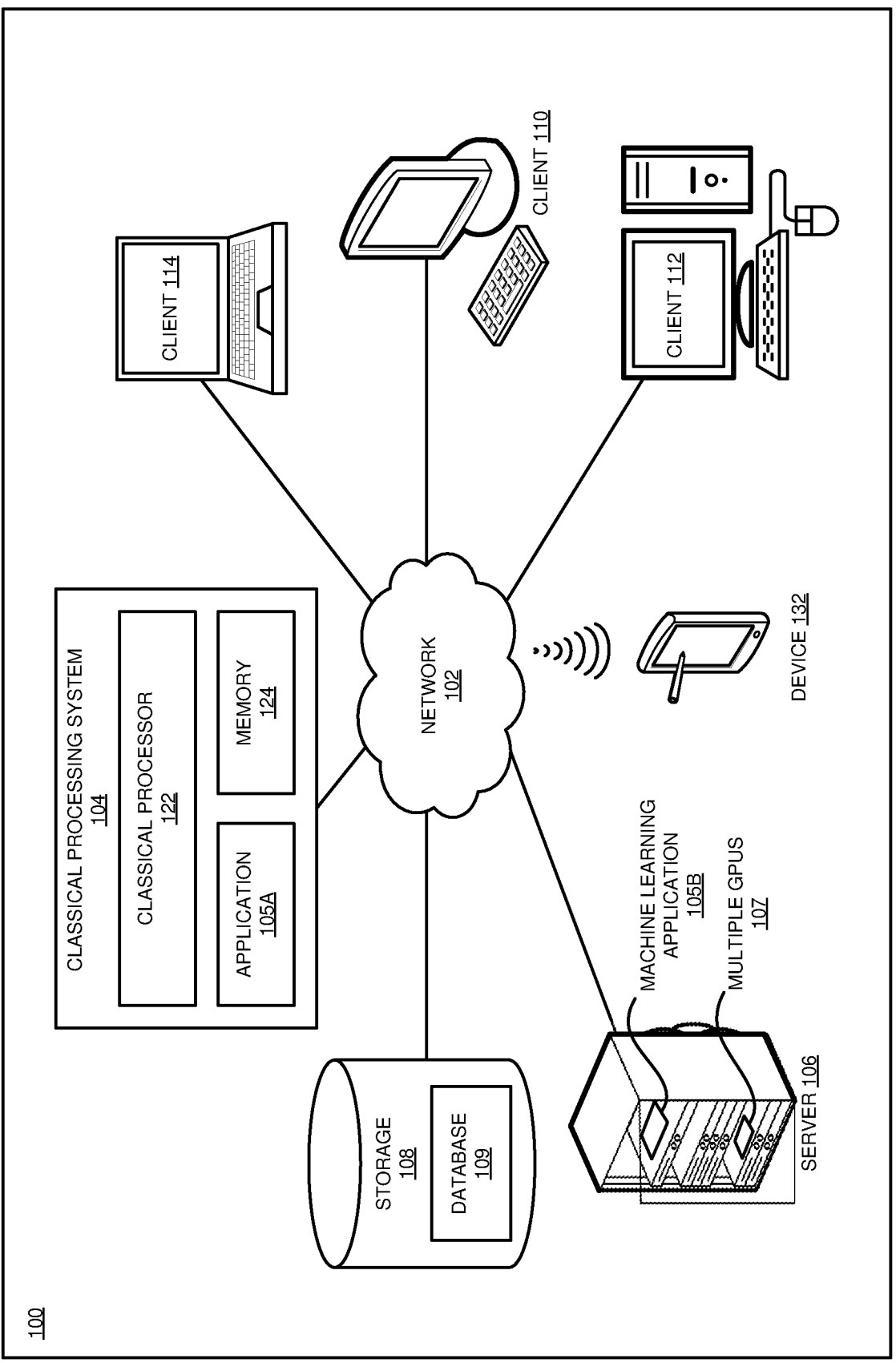
FIG. 1 depicts a block diagram of a network of data processing systems in which illustrative embodiments may be implemented.

Today there are many different machine learning applications that make some type of prediction for a given input value, such as a predicted price or performance value. Machine learning applications use a machine learning model to predict an output data value (y) for a given input data value (x). A machine learning model is created using a dataset referred to as training data. Training data includes typical input values and corresponding expected output values.

Over time, it is common for developers to revise the source code for a software application (more simply referred to herein as an "application"), for example to add features or fix bugs in the source code. It is generally considered good practice to assign a unique version name or number to an application each time it is updated. This practice is referred to as version control or revision control and provides a logical way to track and organize versions of an application.

Version control for software applications may be managed by a version control system. A version control system tracks changes to source code and assigns unique version numbers to source code files as the application changes over time. Such systems assign version numbers according to various schemes that distinguish between major and minor updates. This distinction is important for various reasons. For example, a major change is generally considered to involve a greater amount of risk for users to adopt than a minor change, such as a greater risk for compatibility issues with hardware or other software. Version control systems distinguish major revisions from minor revisions based on significance, which is typically based on such things as number of lines of code that have changed, and number of functions added or removed.

The illustrative embodiments recognize that, while a machine learning model is a significant part of a machine learning application, changes to the model are made by a machine learning training process rather than by developers changing lines of source code. Thus, the illustrative embodiments recognize that existing version control schemes and systems base categorization of changes on factors that are not applicable to changes to a machine learning model.

The illustrative embodiments further recognize that existing version control schemes and systems lack the ability to determine the significance of changes to a machine learning model. When a model is trained with new data, the training may result in changes to one or more parameter values of the model. The updated parameter value(s) may cause the output values of the model to change by a small or large amount. For example, an updated model may output a set of values that is skewed and/or resized by large amounts compared to the version of the model just prior to the update. While such a change would likely have a very significant impact on a machine learning application that includes the updated model, existing version control schemes and systems that evaluate the application for changes to source code and for functionality changes would not detect the change caused by the updated model.

An embodiment can be implemented as a software application. The application implementing an embodiment can be configured as a modification of an existing version control system, as a separate application that operates in conjunction with an existing version control system, a standalone application, or some combination thereof. For example, the application implementing an embodiment can be configured as a modification to add the application as a Regression Model Version Tagger (RMVT) to an existing version control system, as a separate RMVT application that operates in conjunction with an existing version control system, a standalone RMVT application, or some combination thereof.

In an embodiment, a model is essentially a formula with a plurality of parameters that were trained by input data. The model is updated using new training data that may be incremental to training data that was previously used to train the model, or may be a replacement for the previously used training data. Depending on the set of input data used to update the model, the parameters may change only slightly, or the parameters may change by large amounts. In an embodiment, the significance of the parameter changes are evaluated to determine whether the updated model constitutes a major or minor change.

An embodiment analyzes an output set of an updated model for comparison with an output set of the model prior to the update and determines the significance of the update based on the comparison results. An embodiment includes one or more threshold values that are used to classify the significance of the update, for example as a major or minor update. Embodiments are not limited to major and minor update classifications, but instead may have any desired number of such classifications. For example, an embodiment includes nominal, minor, moderate, and major classifications.

In an exemplary embodiment, an application specifies an "original" model to update. For example, the original model may be designated for an update in order to make some change to the model, such as adding or removing one or more features, which influences the original model to emerge into a new version as an updated model.

In an exemplary embodiment, the model is a linear regression model. In some such embodiments, the application trains the linear regression model using a training process that includes the use of training data. As a non-limiting example, in an embodiment, if the model is a new model (i.e., a first generated model), the application initializes the model parameters to some initial values, which may be random or selected values, whereas if the model is an original model being updated, the application may use the existing model parameters. The application then inputs the parameters into an algorithm selected for the model. The application then uses the algorithm with the parameters to generate predictions for training input values in the training data. The application then calculates residuals (also referred to as error terms), which include the differences between each output from the model being trained and a corresponding training output value from the training data. The residuals provide a series of error values. In an embodiment, the application uses a least squares technique, where each residual value is squared and summed to calculate a residual sum of squares (RSS). The parameters are then adjusted, and the training input values are inputted to the model again, resulting in another RSS value for the adjusted parameters.

In some embodiments, the application continues using an iterative process of adjusting parameters and inputting training input data with the goal of minimizing the RSS value. In some embodiments, the application selects parameters that minimize the RSS value by defining a cost function and minimizing it via gradient descent. In some embodiments, the cost function is the same as the RSS, and the gradient descent changes parameter values by taking a partial derivative of the parameters to get the slope of the cost function, which is used to update the parameter values until the slope can no longer provide a direction for a next parameter set, indicating that the RSS has been minimized.

In an exemplary embodiment, the application evaluates the boundaries of the updated model and generates an updated function map representative of a range of output values of the updated model. In some embodiments, the application generates the updated function map using an iterative process that determines input test values that cause the updated model to output the updated function map. For example, in some embodiments, the application uses an iterative process that includes iteratively inputting different input test values selected from a range of values until a boundary of the function map is detected.

In an exemplary embodiment, the application compares the updated function map to a function map generated by the original model. In some embodiment, the application first detects whether the updated model is a first generated model, or an updated version of an original model. Upon determining that the updated model is not a first generated model, the application retrieves the original function map from memory and uses it as a point of comparison for the updated function map.

In an exemplary embodiment, the application assigns a version and version classification to the updated model according to a classification rule for assigning a version classification. In some embodiments, the classification rule specifies how to classify the update based on a comparison value resulting from a comparison of the original function map and the updated function map. In some such embodiments, the classification rule assigns the version classification based on whether the comparison of the updated function map to the original function map results in a difference that exceeds a specified threshold value. For example, in some such embodiments, the classification rule includes assigning the version classification of the updated model as a major revision if the difference exceeds a specified threshold value, or otherwise assigns the version classification of the updated model as a minor revision.

In some embodiments, the application stores the version and version classification of the updated model in memory. Also, or alternatively, in some embodiments, the application adds or edits metadata of the updated model to include the version and version classification of the updated model. In some embodiments, the application then deploys the updated model into a production environment.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
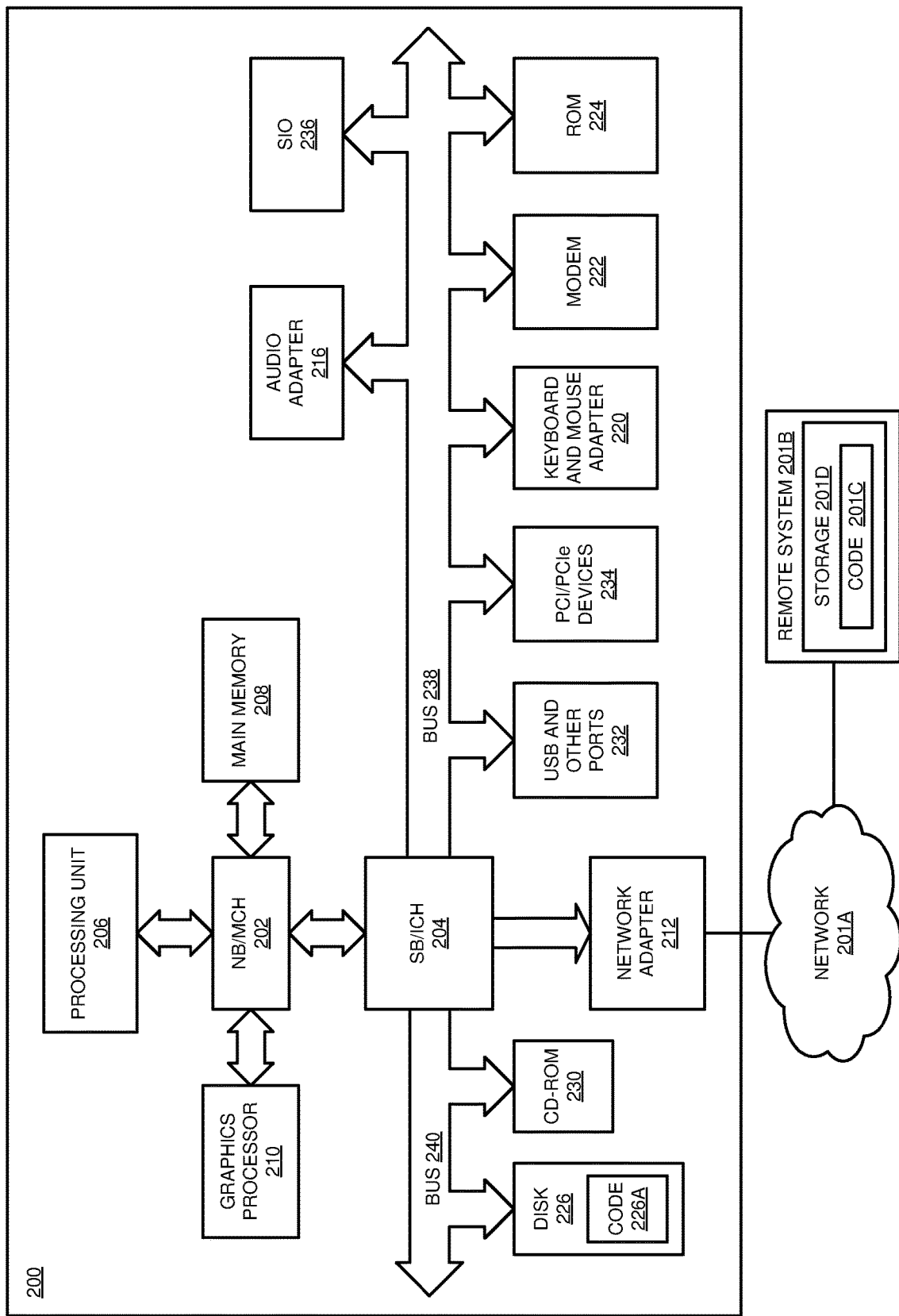
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
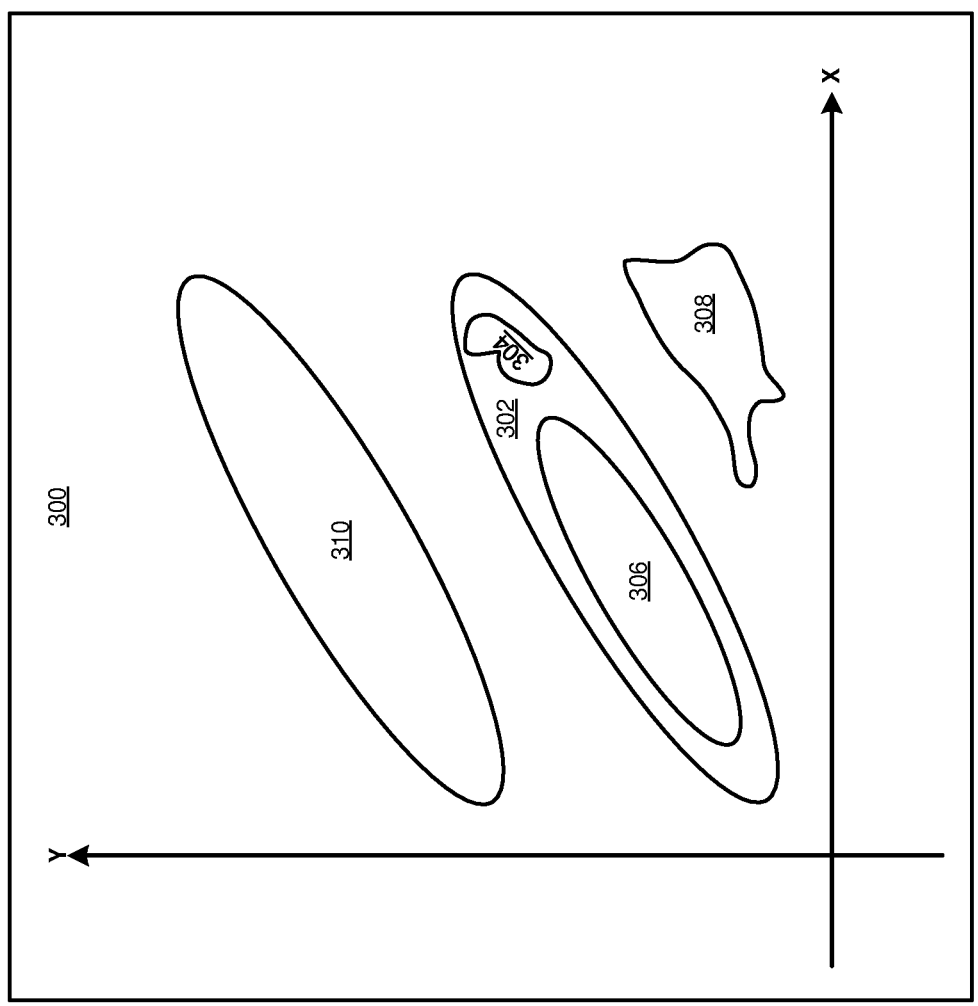
FIG. 3 depicts an example graph of examples of function maps in accordance with an illustrative embodiment.

With reference to FIG. 3, this figure depicts an example graph 300 of examples of function maps in accordance with an illustrative embodiment. In a particular embodiment, the function maps are generated using a predefined dataset by application 105A/105B of FIG. 1.

In the illustrated embodiment, graph 300 includes an example of an original function map 302, which is a boundary that encloses output values from an example original model, and examples of updated function maps 304, 306, 308, and 310, which enclose sets of output values for respective examples of updated models. Here "original" refers to the version of a model immediately prior to the updated version that is retrained to generate the updated version of the model, and the "original" model may, itself, be an updated version of an earlier version of the model.

In some embodiments, updates to the original model that result in function map 304 may be considered a major revision because the changes in shape and size compared to function map 302 exceed specified threshold values. In some embodiments, updates to the original model that result in function map 306 may be considered a minor revision because the shape is substantially the same and the change in size compared to function map 302 does not exceed a specified threshold value. In some embodiments, updates to the original model that result in function map 308 may be considered a major revision because the change in shape compared to function map 302 exceeds a specified threshold value. In some embodiments, updates to the original model that result in function map 310 may be considered a minor revision because the small changes in shape and size compared to function map 302 do not exceed specified threshold values.

Figure 4:
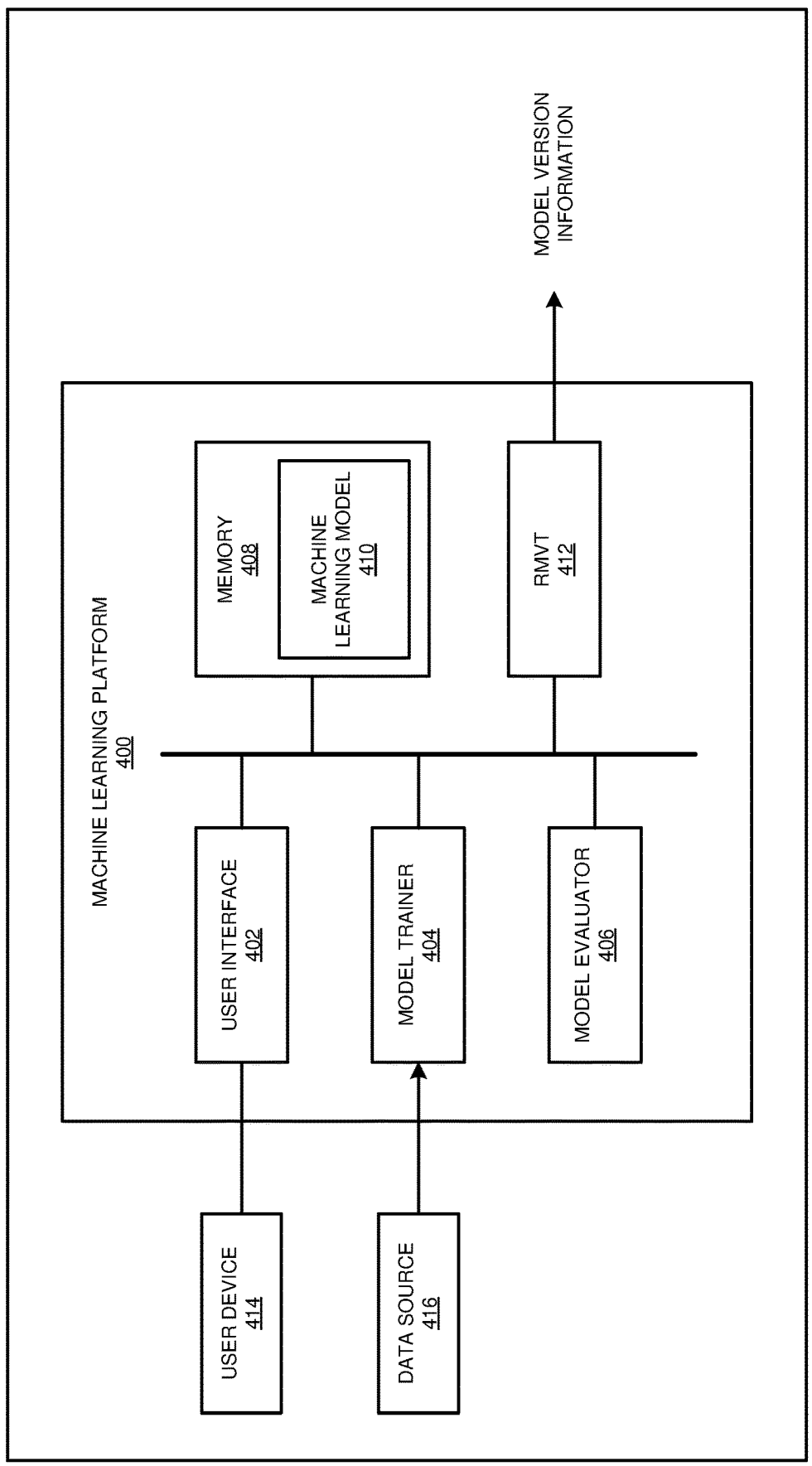
FIG. 4 depicts a block diagram of an example machine learning platform in accordance with an illustrative embodiment.

With reference to FIG. 4, this figure depicts a block diagram of an example machine learning platform 400 in accordance with an illustrative embodiment. In a particular embodiment, platform 400 is an example of application 105A/105B of FIG. 1.

In some embodiments, the machine learning platform 400 includes a user interface 402, a model trainer 404, a model evaluator 406, a memory 408 storing one or more machine learning models 410, and a Regression Model Version Tagger (RMVT) 412. In alternative embodiments, the machine learning platform 400 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the user interface 402 includes a graphical user interface (GUI) and/or a command line interface. In some embodiments, the user interface 402 generates display data that instructs a user device 414 to render a display for a user, which may include text and/or graphical elements. In some embodiments, the user interface 402 allows a user to interact with the machine learning platform 400 using the user device 414. In some embodiments, the user device 414 may be any of a variety of computing devices, for example a desktop or laptop computer, smart phone, or tablet. In some embodiments, the user interface 402 allows a user to interact with the machine learning platform 400. For example, in some embodiments, the user interface 402 includes functionality that allows a user to submit various commands for causing the machine learning platform 400 to perform tasks related to training and evaluating machine learning models. In some embodiments, the user interface 402 includes functionality that allows a user to upload data or instruct the machine learning platform 400 to retrieve data from a specified location, for example a remote database accessible via a network connection.

In some embodiments, the model trainer 404 generates a machine learning model 410 using training data from a data source 416. In some embodiments, the model trainer 404 generates the machine learning model 410 as an initial version using an algorithm and training data. In some embodiments, the model trainer 404 generates the machine learning model 410 as an update of earlier version of the learning model 410. In some embodiments, the model trainer 404 includes a machine learning algorithm that receives the training data from data source 416 and generates a set of parameter values for the machine learning model. In some such embodiments, the parameter values are set to cause the model to accurately generate output values as close as possible to values that are expected for given input values. In some embodiments, the data source 416 provides training data that includes a plurality of training input values upon which to make a prediction and a plurality of training labels representing target output values for respective training input values.

In an exemplary embodiment, the model is a linear regression model. In some such embodiments, the model trainer 404 trains the linear regression model using a training process that includes the use of training data. As a non-limiting example, in an embodiment, if the model is a new model (i.e., a first generated model), the model trainer 404 initializes the model parameters to some initial values, which may be random or selected values, whereas if the model is an original model being updated, the model trainer 404 may use the existing model parameters. The model trainer 404 then inputs the parameters into an algorithm selected for the model. The model trainer 404 then uses the algorithm with the parameters to generate predictions for training input values in the training data. The model trainer 404 then calculates residuals (also referred to as error terms), which include the differences between each output from the model being trained and a corresponding training output value from the training data. The residuals provide a series of error values. In an embodiment, the model trainer 404 uses a least squares technique, where each residual value is squared and summed to calculate a residual sum of squares (RSS). The parameters are then adjusted, and the training input values are inputted to the model again, resulting in another RSS value for the adjusted parameters.

In some embodiments, the model trainer 404 continues using an iterative process of adjusting parameters and inputting training input data with the goal of minimizing the RSS value. In some embodiments, the model trainer 404 selects parameters that minimize the RSS value by defining a cost function and minimizing it via gradient descent. In some embodiments, the cost function is the same as the RSS, and the gradient descent changes parameter values by taking a partial derivative of the parameters to get the slope of the cost function, which is used to update the parameter values until the slope can no longer provide a direction for a next parameter set, indicating that the RSS has been minimized.

In some embodiments, the model evaluator 406 evaluates the boundaries of the updated model and generates an updated function map representative of a range of output values of the updated model. In some embodiments, the model evaluator 406 generates the updated function map using an iterative process that determines input test values that cause the updated model to output the updated function map. For example, in some embodiments, the model evaluator 406 uses an iterative process that includes iteratively inputting different input test values selected from a range of values until a boundary of the function map is detected.

In some embodiments, the RMVT 412 compares the updated function map to a function map generated by the original model. In some embodiment, the RMVT 412 first detects whether the updated model is a first generated model, or an updated version of an original model. Upon determining that the updated model is not a first generated model, the RMVT 412 retrieves the original function map from memory and uses it as a point of comparison for the updated function map.

In an exemplary embodiment, the RMVT 412 assigns a version and version classification to the updated model according to a classification rule for assigning a version classification. In some embodiments, the classification rule specifies how to classify the update based on a comparison value resulting from a comparison of the original function map and the updated function map. In some such embodiments, the classification rule assigns the version classification based on whether the comparison of the updated function map to the original function map results in a difference that exceeds a specified threshold value. For example, in some such embodiments, the classification rule includes assigning the version classification of the updated model as a major revision if the difference exceeds a specified threshold value, or otherwise assigns the version classification of the updated model as a minor revision.

In some embodiments, the RMVT 412 stores the version and version classification of the updated model in memory. Also, or alternatively, in some embodiments, the RMVT 412 adds or edits metadata of the updated model to include the version and version classification of the updated model. In some embodiments, the RMVT 412 then deploys the updated model into a production environment.

Figure 5:
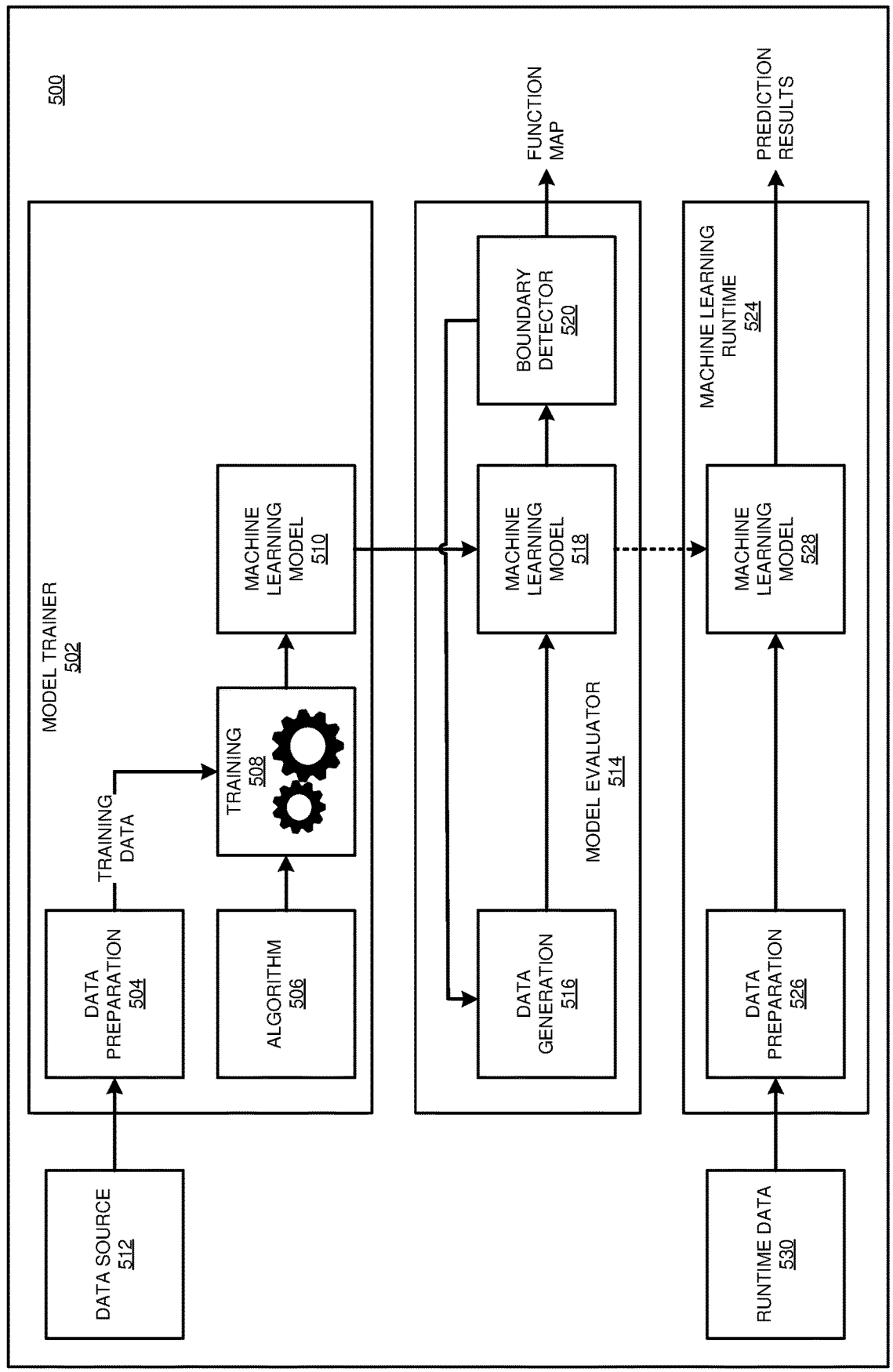
FIG. 5 depicts a block diagram of an example machine learning environment 500 in accordance with an illustrative embodiment.

With reference to FIG. 5, this figure depicts a block diagram of an example machine learning environment 500 in accordance with an illustrative embodiment. In the illustrated embodiment, the machine learning environment 500 includes a model trainer 502, a model evaluator 514, and a machine learning runtime environment 524. In a particular embodiment, model trainer 502 is an example of model trainer 404 of FIG. 4 and model evaluator 514 is an example of model evaluator 406 of FIG. 4.

In the illustrated embodiment, the model trainer 502 includes a data preparation module 504, algorithm module 506, training module 508, and machine learning model 510. In the illustrated embodiment, the model evaluator 514 includes a data generation module 516, trained machine learning model 518, and boundary detector 520. In the illustrated embodiment, runtime environment 524 includes a data preparation module 526 and machine learning model 528. In alternative embodiments, the model trainer 502, model evaluator 514, and runtime environment 524 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the model trainer 502 generates a machine learning model 510 based on an algorithm provided by algorithm module 506. In an embodiment, the algorithm module 506 selects the algorithm based on one or more known machine learning algorithms. In an embodiment, model trainer 502 includes a training module 508 that trains the machine learning model 510 using training data from a data source 512.

In some embodiments, the training data, testing data, and runtime data is pre-processed by a data preparation module 504 or 526. In some such embodiments, the data preparation modules 504 and 526 structures the data to make best use of the machine learning model 510. Embodiments of the data preparation modules 504 and 526 use one or more of the following heuristics:

Linear data transformation: transform the data to make the relationship linear (e.g. log transform for an exponential relationship);

Noise reduction: use data cleaning operations that better expose and clarify the signal in the data, e.g., remove outliers in the output variable (y) where possible;

Collinearity reduction: calculate pairwise correlations for the input data and remove the most correlated to prevent over-fitting of the data due to highly correlated input variables;

Gaussian distribution: transform the input data (e.g., logarithmic or Box-Cox transformation) so that input and output variables have a Gaussian distribution; and Rescale Inputs: scale data using normalization (e.g., rescale data so that values are within a range of 0 and 1) or standardization (e.g., rescale data so that the mean of observed values is 0 and the standard deviation is 1).

In an embodiment, the training module 508 trains the machine learning model 510 using training data appropriate for the current domain being modeled. For example, in an embodiment, the machine learning model 510 is a regression model, for example a linear regression model.

In an embodiment, the model evaluator 514 receives the trained machine learning model 518, which is a trained (or re-trained), and thereby updated, version of the machine learning model 510. In some embodiments, the model evaluator 514 evaluates the boundaries of the updated machine learning model 518 and generates an updated function map representative of a range of output values of the updated machine learning model 518. In some embodiments, the model evaluator 514 includes data generation module 516, which generates input test values that cause the updated machine learning model 518 to output values to a boundary detector 520. The boundary detector 520 generates the updated function map. The model evaluator 514 performs an iterative process in which the data generation module 516 iteratively inputs different input test values selected from a range of values to the updated machine learning model 518, which provides corresponding outputs to the boundary detector 520. The boundary detector 520 determines whether a boundary has been reached and notifies the data generation module 516 when a boundary is reached. The data generation module 516 uses the feedback to determine whether to continue along a range of values for the input data provided to the updated machine learning model 518. The data generation module 516 continues to output values along a range of values for the input data provided to the updated machine learning model 518. until a boundary of the function map is detected. The data generation module 516 then tries a different range of values until being notified by the boundary detector 520 that the boundary is complete. Once the boundary is complete, the boundary detector 520 outputs the function map corresponding to the completed boundary of output values from the updated machine learning model 518.

In some embodiments, the runtime environment 524 receives the evaluated machine learning module 528. In some embodiments, the runtime environment 524 may be local to the model evaluator 514 and model trainer 502, while in alternative embodiments, the runtime environment 524 may be remotely located (e.g., located on a remote server connected via a network connection to the model evaluator 514 and model trainer 502).

In some embodiments, the runtime environment 524 uses the machine learning model 528 to infer and make predictions about the input runtime data 530. Actual implementations of the runtime environment 524 may be utilized in a wide variety of applications, including non-limiting examples such as predicting future values of commodities, predicting salaries based on years of experience, or predicting grades based on hours of studying. Thus, the machine learning model 528 outputs a prediction result for each of the received input values in the runtime data 530.

Figure 6:
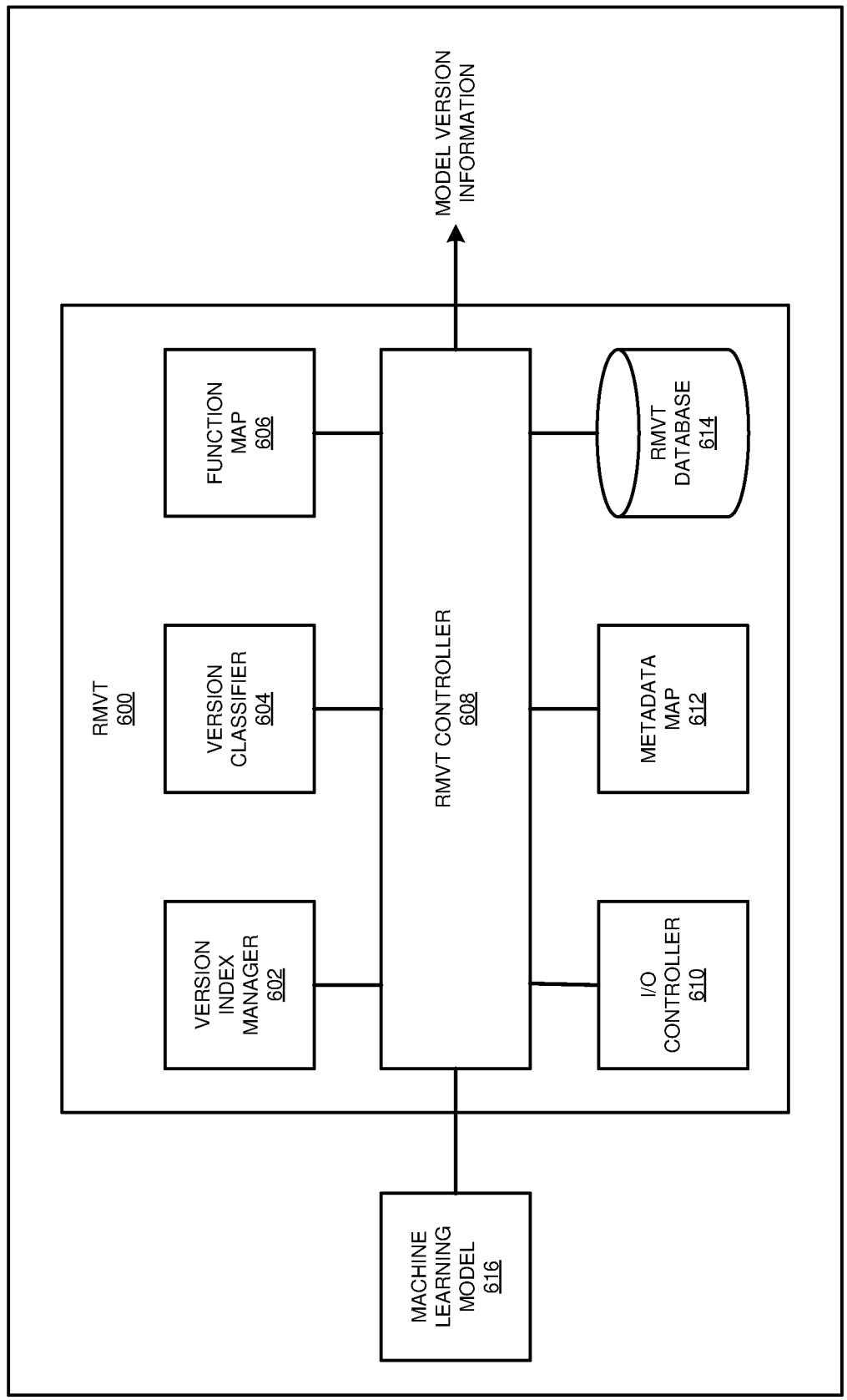
FIG. 6 depicts a block diagram of an example RMVT in accordance with an illustrative embodiment.

With reference to FIG. 6, this figure depicts a block diagram of an example RMVT 600 in accordance with an illustrative embodiment. In a particular embodiment, RMVT 600 is an example of RMVT 412 of FIG. 4.

In the illustrated embodiment, the RMVT 600 includes a version index manager 602, a version classifier 604, a function map module 606, an RMVT controller 608, an I/O controller 610, a metadata map module 612, and an RMVT database 614. In alternative embodiments, the machine learning platform 400 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the version index manager 602 retrieves the version information for the original model and provides it to the version classifier 604. In some embodiments, if the trained model is a first generated model, the version index manager 602 flags the model as being a first generated model. The first generated model flag informs the version classifier 604 of the first generated model status of the model.

In some embodiments, the version classifier 604 compares the updated function map to the original function map in order to identify the variations between the two. The version classifier 604 then assigns a version and version classification to the updated model based on the results of the comparison. The version classifier 604 also receives version information about the original model, and uses this information to determine an appropriate version number for the updated model. In some embodiments, the function map module 606 has pre-defined functions that the version classifier 604 may opt to use for comparison of the original model and the updated model.

In some embodiments, the RMVT 600 includes a RMVT controller 608, which can be a central processing unit (CPU) or a Graphic Processing Unit (GPU). The RMVT controller 608 is operable for performing operations according to software instructions and can include one or more processors that can be local to the RMVT 600 and/or distributed among one or more local and/or remotely networked computer systems. The RMVT controller 608 can also control operations of, and orchestrate the messages across, one or more of the version index manager 602, version classifier 604, function map module 606, I/O controller 610, metadata map module 612, and RMVT database 614.

In some embodiments, the I/O controller 610 can include one or more communication ports, for example a universal serial bus (USB) port, and/or networking devices, for example network adapter and/or modem, for allowing for communications with external devices. In some embodiments, the I/O controller 610 controls messages across external interfaces.

In some embodiments, the metadata map module 612 provides configurable metadata for versioning metadata of the updated model, assigns a version and version classification to the updated model according to a classification rule for assigning a version classification. Also, in some embodiments, the RMVT database 614 stores model version information for models as they are created and updated In some embodiments, the version classifier 604 uses a classification rule that specifies how to classify the updated model 616 based on a comparison value resulting from a comparison, by the version classifier 604, of the original function map and the updated function map. In some such embodiments, the classification rule assigns the version classification based original model version information provided by version index manager 602 and further based on whether the comparison of the updated function map to the original function map results in a difference that exceeds a specified threshold value. For example, in some such embodiments, the classification rule includes assigning the version classification of the updated model as a major revision if the difference exceeds a specified threshold value, or otherwise assigns the version classification of the updated model as a minor revision.

In some embodiments, the application stores the version and version classification of the updated model in the RMVT database 614. Also, or alternatively, in some embodiments, the application adds or edits metadata according to instructions from the metadata map module 612 to include the version and version classification of the updated model. In some embodiments, the application then deploys the updated model into a production environment.

Figure 7:
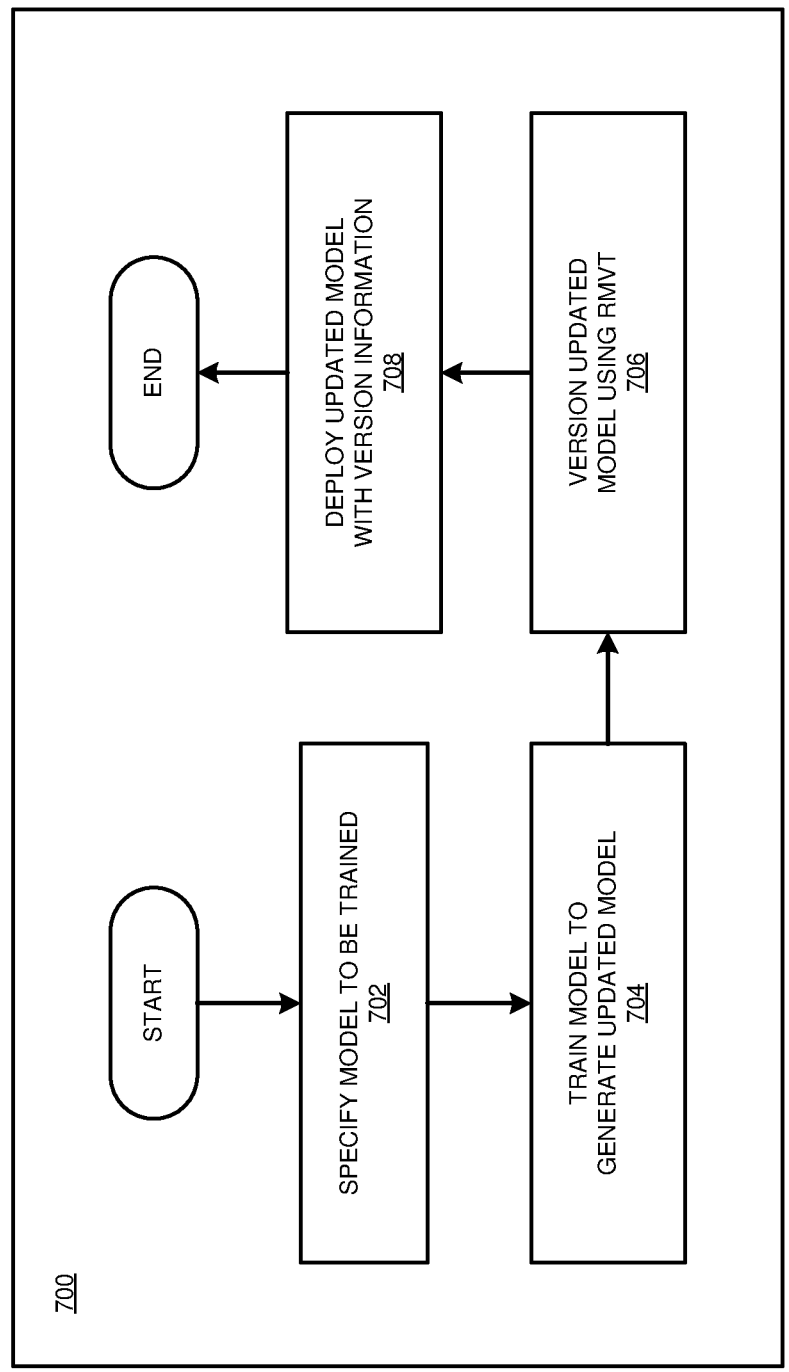
FIG. 7 depicts a flowchart of an example updating and versioning process 700 in accordance with an illustrative embodiment.

With reference to FIG. 7 this figure depicts a flowchart of an example updating and versioning process 700 in accordance with an illustrative embodiment. In a particular embodiment, the machine learning platform 400 carries out the process 700.

In an embodiment, at block 702, the process specifies an "original" model to train for an update. For example, the original model may be designated for an update in order to make some change to the model, such as adding or removing one or more features, which influences the original model to emerge into a new version as an updated model.

In an embodiment, at block 704, the process trains the original model to generate an updated model. For example, in an exemplary embodiment, the model is a linear regression model. In some such embodiments, the process trains the linear regression model using a training process that includes the use of training data. As a non-limiting example, in an embodiment, if the model is a new model (i.e., a first generated model), the process initializes the model parameters to some initial values, which may be random or selected values, whereas if the model is an original model being updated, the process may use the existing model parameters. The process then inputs the parameters into an algorithm selected for the model. The process then uses the algorithm with the parameters to generate predictions for training input values in the training data. The process then calculates residuals (also referred to as error terms), which include the differences between each output from the model being trained and a corresponding training output value from the training data. The residuals provide a series of error values. In an embodiment, the process uses a least squares technique, where each residual value is squared and summed to calculate a residual sum of squares (RSS). The parameters are then adjusted, and the training input values are inputted to the model again, resulting in another RSS value for the adjusted parameters.

In some embodiments, the process continues using an iterative process of adjusting parameters and inputting training input data with the goal of minimizing the RSS value. In some embodiments, the process selects parameters that minimize the RSS value by defining a cost function and minimizing it via gradient descent. In some embodiments, the cost function is the same as the RSS, and the gradient descent changes parameter values by taking a partial derivative of the parameters to get the slope of the cost function, which is used to update the parameter values until the slope can no longer provide a direction for a next parameter set, indicating that the RSS has been minimized.

In an exemplary embodiment, the process evaluates the boundaries of the updated model and generates an updated function map representative of a range of output values of the updated model. In some embodiments, the process generates the updated function map using an iterative process that determines input test values that cause the updated model to output the updated function map. For example, in some embodiments, the process uses an iterative process that includes iteratively inputting different input test values selected from a range of values until a boundary of the function map is detected.

In an embodiment, at block 706, the process versions the updated model using an RMVT. In an exemplary embodiment, the process assigns a version and version classification to the updated model according to a classification rule for assigning a version classification. In an embodiment, at block 708, the process deploys the updated model with its version information.

Figure 8:
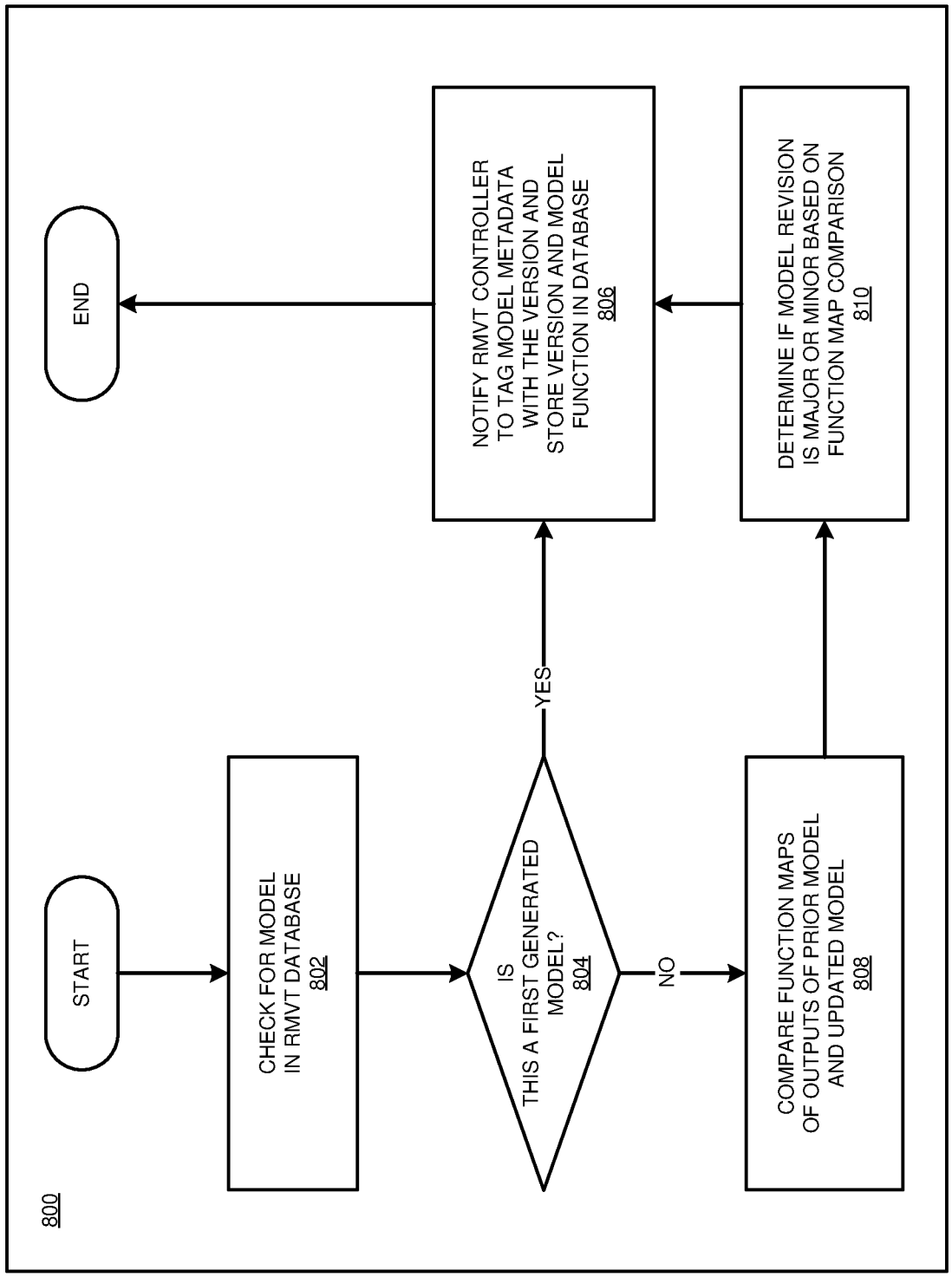
FIG. 8 depicts a flowchart of an example versioning process 800 in accordance with an illustrative embodiment.

With reference to FIG. 8 this figure depicts a flowchart of an example versioning process 800 in accordance with an illustrative embodiment. In a particular embodiment, the RMVT 600 of FIG. 6 carries out the process 800.

In an embodiment, at block 802, the process checks for a newly trained model in a database that maintains records of models and the model versions.

In an embodiment, at block 804, the process determines whether the newly trained model is a first generated model. If so, the process proceeds to block 806; otherwise, the process determines that the newly trained model is an updated model, and continues to block 808. In some embodiments, upon determining that the newly trained model is an updated model rather than a first generated model, the process retrieves the original function map (i.e., the version of the updated model just prior to being updated) from memory for use as a point of comparison for the updated function map.

In an embodiment, at block 808, the process the process compares an updated function map generated by the updated model to a function map generated by the original model.

In an embodiment, at block 810, the process determines if the model revision resulting in the updated model is a major or minor revision based on a function map comparison. In such embodiments, the process assigns a version and version classification to the updated model according to a classification rule for assigning a version classification. In such embodiments, the classification rule specifies how to classify the update based on a comparison value resulting from a comparison of the original function map and the updated function map. In some such embodiments, the classification rule assigns the version classification based on whether the comparison of the updated function map to the original function map results in a difference that exceeds a specified threshold value. For example, in some such embodiments, the classification rule includes assigning the version classification of the updated model as a major revision if the difference exceeds a specified threshold value, or otherwise assigns the version classification of the updated model as a minor revision.

Embodiments are not limited to choosing between major and minor classifications of revisions. In alternative embodiments, the process determines if the model revision resulting in the updated model is classified in one of three or more different classifications of revisions.

In an embodiment, at block 806, the process includes providing a notification to the RMVT controller 608 to tag the metadata of the updated model with the version and version classification of the updated model. Also, in some embodiments, the version and version classification of the updated model are stored in memory, such as RMVT database 614 of FIG. 6. In some embodiments, the application then deploys the updated model into a production environment.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 6%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    specifying an original model to be trained by a machine learning platform using training data and an algorithm, wherein the training data includes a plurality of training input values upon which to make a prediction and a plurality of training output values representing target prediction values for respective input values;
    generating an updated model by training the original model to algorithmically approach the training output values as provided with the training data based on the plurality of input values;
    generating an updated function map representative of output values of the updated model;
    versioning the updated model according to a classification rule for assigning a version classification based on a comparison of the updated function map to an original function map representative of output values of the original model; and
    deploying the updated model into a production environment, to replace the original model.

2. The computer-implemented method of claim 1, wherein the original model is a linear regression model.

3. The computer-implemented method of claim 1, further comprising editing metadata of the updated model to include the version classification.

4. The computer-implemented method of claim 1, further comprising detecting that the updated model is not a first generated model.

5. The computer-implemented method of claim 4, further comprising, responsive to determining that the updated model is not a first generated model, retrieving the original function map from memory for the comparison to the updated function map.

6. The computer-implemented method of claim 5, further comprising, responsive to the versioning of the updated model, storing the version classification of the updated model in the memory.

7. The computer-implemented method of claim 1, wherein the generating of the updated function map includes performing an iterative process such that the iterative process determines input test values that cause the updated model to output the updated function map.

8. The computer-implemented method of claim 7, wherein the iterative process comprises iteratively inputting input test values selected from a range of values until a boundary of the function map is detected.

9. The computer-implemented method of claim 1, wherein the classification rule includes assigning the version classification based on whether the comparison of the updated function map to the original function map results in a difference that exceeds a specified threshold value.

10. The computer-implemented method of claim 9, wherein the classification rule includes assigning the version classification of the updated model as a major revision responsive to detecting that the difference exceeds the specified threshold value.

11. A computer program product comprising one or more computer readable storage media, and program instructions collectively stored on the one or more computer readable storage media, the program instructions executable by a processor to cause the processor to perform operations comprising:
    specifying an original model to be trained by a machine learning platform using training data and an algorithm, wherein the training data includes a plurality of training input values upon which to make a prediction and a plurality of training output values representing target prediction values for respective input values;
    generating an updated model by training the original model to algorithmically approach the training output values as provided with the training data based on the plurality of input values;
    generating an updated function map representative of output values of the updated model;
    versioning the updated model according to a classification rule for assigning a version classification based on a comparison of the updated function map to an original function map representative of output values of the original model; and
    deploying the updated model into a production environment, to replace the original model.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    program instructions to meter use of the program instructions associated with the request; and
    program instructions to generate an invoice based on the metered use.

14. The computer program product of claim 11, wherein the generating of the updated function map includes performing an iterative process such that the iterative process determines input test values that cause the updated model to output the updated function map.

15. The computer program product of claim 14, wherein the iterative process comprises iteratively inputting input test values selected from a range of values until a boundary of the function map is detected.

16. The computer program product of claim 11, wherein the classification rule includes assigning the version classification based on whether the comparison of the updated function map to the original function map results in a difference that exceeds a specified threshold value.

17. A computer system comprising a processor and one or more computer readable storage media, and program instructions collectively stored on the one or more computer readable storage media, the program instructions executable by the processor to cause the processor to perform operations comprising:
- specifying an original model to be trained by a machine learning platform using training data and an algorithm, wherein the training data includes a plurality of training input values upon which to make a prediction and a plurality of training output values representing target prediction values for respective input values;
- generating an updated model by training the original model to algorithmically approach the training output values as provided with the training data based on the plurality of input values;
- generating an updated function map representative of output values of the updated model;
- versioning the updated model according to a classification rule for assigning a version classification based on a comparison of the updated function map to an original function map representative of output values of the original model; and
- deploying the updated model into a production environment, to replace the original model.

18. The computer system of claim 17, wherein the generating of the updated function map includes performing an iterative process such that the iterative process determines input test values that cause the updated model to output the updated function map.

19. The computer system of claim 18, wherein the iterative process comprises iteratively inputting input test values selected from a range of values until a boundary of the function map is detected.

20. The computer system of claim 17, wherein the classification rule includes assigning the version classification based on whether the comparison of the updated function map to the original function map results in a difference that exceeds a specified threshold value.

\* \* \* \* \*